Sept. 19, 1967 E. BENEDICT 3,342,938

AUTOMATIC DIAL TELEPHONE ALARM SYSTEM WITH FINGERWHEEL FRICTIONALLY DRIVEN BY SLIDABLY MOUNTED FRICTION WHEEL

Filed Oct. 21, 1963 4 Sheets-Sheet 1

INVENTOR
ELMER BENEDICT

BY John B. Dickman III
AGENT

Sept. 19, 1967 E. BENEDICT 3,342,938

AUTOMATIC DIAL TELEPHONE ALARM SYSTEM WITH FINGERWHEEL FRICTIONALLY DRIVEN BY SLIDABLY MOUNTED FRICTION WHEEL

Filed Oct. 21, 1963 4 Sheets-Sheet 2

INVENTOR
ELMER BENEDICT

BY John B. Dickman III
AGENT

INVENTOR
ELMER BENEDICT

BY John B. Dickman III
AGENT

INVENTOR
ELMER BENEDICT

BY John B. Dickman III
AGENT

United States Patent Office 3,342,938

Patented Sept. 19, 1967

3,342,938

AUTOMATIC DIAL TELEPHONE ALARM SYSTEM WITH FINGERWHEEL FRICTIONALLY DRIVEN BY SLIDABLY MOUNTED FRICTION WHEEL

Elmer Benedict, 950 Pearse Road, Schenectady, N.Y. 12309

Filed Oct. 21, 1963, Ser. No. 317,424

10 Claims. (Cl. 179—5)

ABSTRACT OF THE DISCLOSURE

An alarm system for use in connection with a telephone, which will automatically dial a predetermined number and report a fire, burglary or other emergency and continue reporting same until switched off.

This invention relates generally to alarm systems and particularly to a novel system to be employed in cooperation with a telephone for providing an alarm for various occurrences which require immediate and prompt attention.

Alarm systems presently available in the art are, for the most part, expensive and complicated, requiring extensive equipment and maintenance. Furthermore, those prior systems which proved to be reliable and practical, did not combine the functions for reporting more than one occurrence of an ill happening to a premises, but were designed to handle one type of disaster. That is, burglary alarm systems would not give an alarm for fire or loss of refrigeration, and vice versa. The multiplication of these functions within a particular system has in the past been unfeasable in actual practice as the result of the complex equipments which were required. Those systems which provide for direct contact with the police or fire departments, further required extensive equipment resulting in a large expense to the purchaser. As a result of these shortcomings and disadvantages in alarm systems, many attempts have been made to provide a feasable system which can be employed with a telephone and its associated equipment.

Many alarm system and telephone combinations have been attempted in the past without any favorable results. Some of these combinations were in some fashion attached to the telephone or in the lines thereof, while others prohibited the use of the telephone by not allowing access thereto. It is, however, the practice of the telephone companies to prohibit any actual connection or attachment of equipment to a telephone or its associated equipment, or the placing of equipment over a telephone which would prohibit its intended use by a consumer.

Other prior known devices for producing an alarm are relatively ineffective in attaining their purpose and, therefore, do not provide optimum protection against the occurrence of ill happenings to a premises. Such devices may exhibit a flashing light in a window or sound a siren which is usually disregarded by the public.

It is, therefore, the primary object of this invention to provide an alarm system which is simple in structure while offering the maximum in protection to a premises.

It is another object of the present invention to provide an alarm system for protection against a multitude of occurrences which require immediate and prompt attention.

Another object of this invention is to provide an alarm system which functions in cooperation with a telephone system and is not connected or attached thereto and allows for calls to be placed thereon without any interference.

Still another object of this invention is to provide an alarm system which is reliable and effective in its desired purpose.

These and other objects of the present invention are provided by the simple structure including a plurality of transducers each for detecting the occurrence of a condition. Each transducer is connected to actuate a particular channel of a system which includes means for rotating a friction wheel placed in contact with the dial of a telephone, a lifting device for the receiver of the telephone and a sound transmitting device in adjacent relationship to the microphone of the receiver. The dial is rotated through a predetermined angle and released and the transmitting device relates an alarm which is detected by the microphone of the receiver and transmitted over the telephone lines to the operator. The system continues to operate until it is made inoperative by a person on the premises.

The invention, however, will be more fully realized and understood from the following detailed description when taken in conjunction with the accompanying drawings wherein like reference numerals designate similar elements and wherein.

Figure 1:
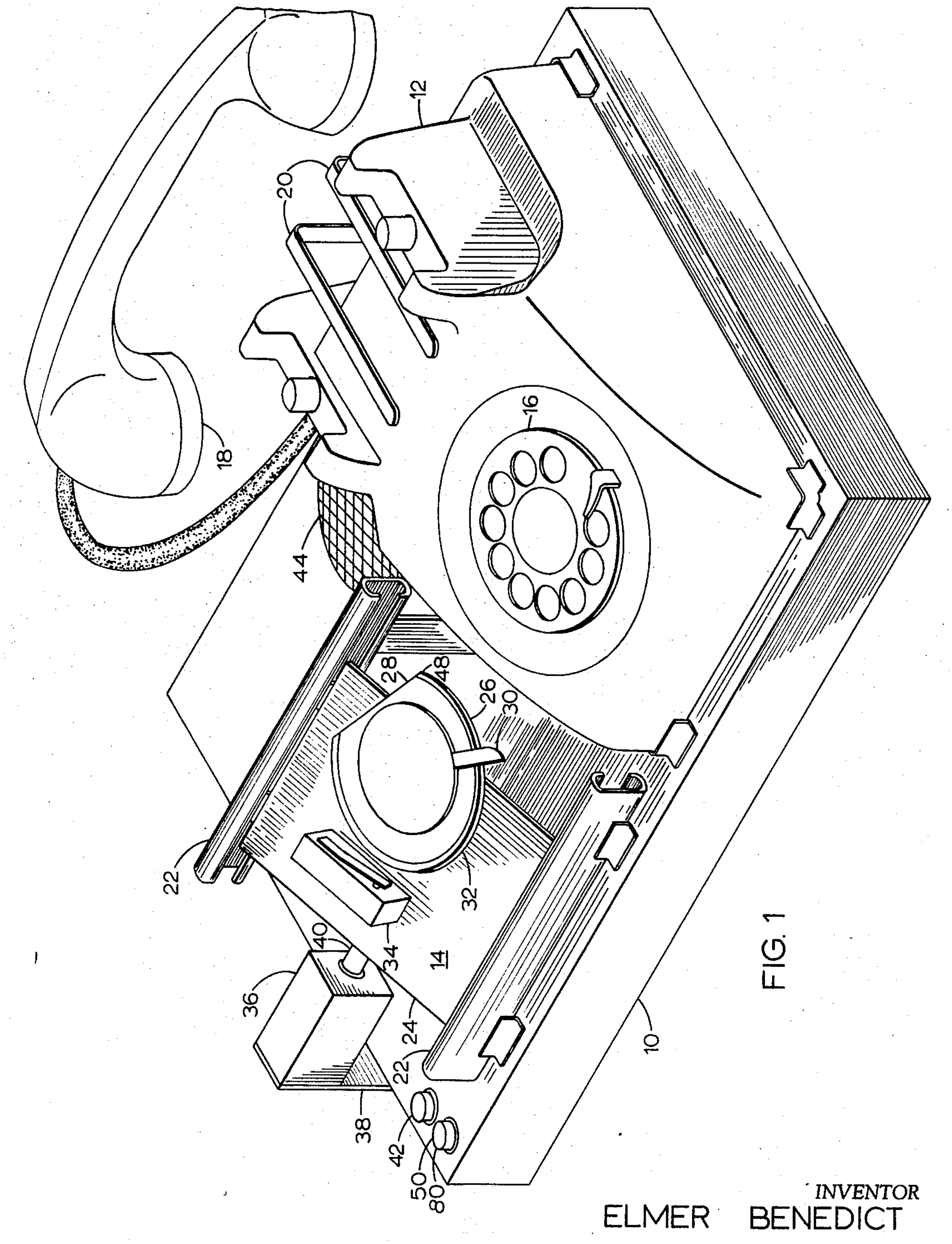
FIGURE 1 is a perspective view of the present invention illustrating the relative position of the various elements of the system.
Figure 2:
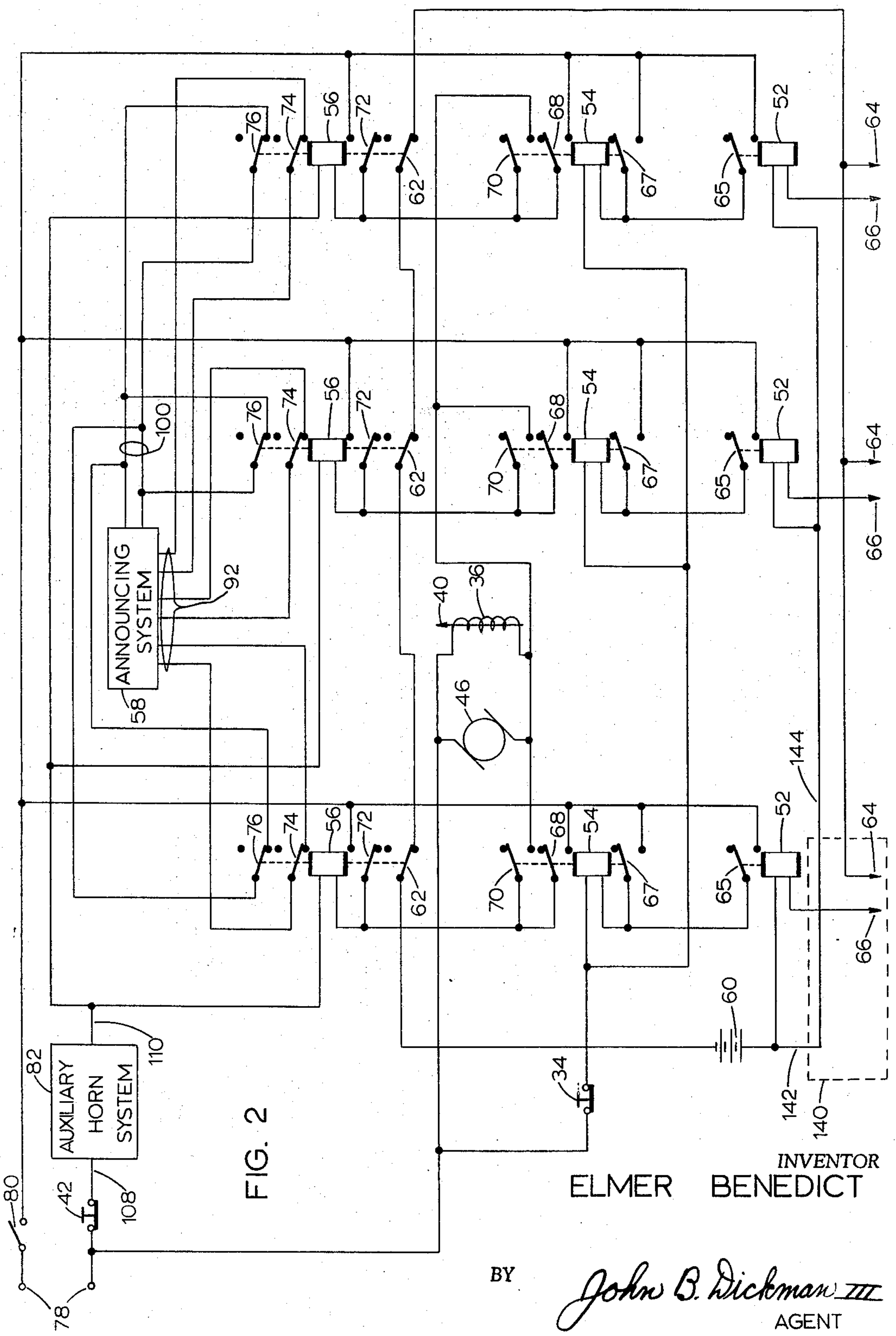
FIGURE 2 is a schematic diagram of the electrical system of the invention.

In reference to FIGURE 1, a chassis 10 is provided for supporting a telephone 12 and the dialing mechanism 14 on an upper surface and the circuitry of FIGURE 2 on a lower interior surface thereof. Telephone 12 includes a dial 16 and a receiver 18 having a microphone. Positioned between the body of telephone 12 and receiver 18 are a pair of fingers 20 for providing lifting action to the receiver and thereby providing a connection between the microphone of the receiver and the telephone line. A pair of slides 22 are placed in adjacent relationship to the telephone and provide a slidable mount for a plate 24. A wheel 26 is rotatably mounted on plate 24 and includes a flat portion 28 in the periphery thereof and an arm 30 attached thereto. A friction material 32 is secured to the arcuate periphery of wheel 26 to provide frictional engagement with the periphery of dial 16. A motor 46 is mounted below plate 24 for providing the rotation to wheel 28 and is shown in the schematic of FIGURE 2. Also secured to plate 24 is a switch 34 which is disposed for actuation by arm 30 during the rotation of wheel 26 to disconnect motor 46 from a source of power. Receiver 18 is shown in FIGURE 1 removed from its cradle on the telephone body to better illustrate the position of fingers 20.

A solenoid 36 is secured to chassis 10 by a bracket 38 and includes a plunger 40 for translating plate 24 from the position shown to a position wherein wheel 26 is in engagement with dial 16 of telephone 12. Solenoid 36 is connected in parallel relationship with motor 46 and is likewise disconnected from the source of power by switch 34. Solenoid plunger 40 is secured to plate 24 and is biased to return to the non-engaged position shown in the drawing. The solenoid has inherent in the structure thereof the function of allow fluctuations in the dial and wheel without any loss of engagement therebetween. A switch 42 is also secured to the chassis and provides a cutoff for the entire system and a speaker 44 provides the transmission of sound to the microphone of receiver 18. A light 50 may also be provided to indicate the operating condition of the system and a switch 80 in combination therewith to remove power from the system.

The operation of the device which will be more apparent from the discussion of FIGURE 2 is as follows: Upon actuation of the system, solenoid 36 through plunger 40 translates dialing mechanism 14 to a position of engagement between wheel 26 and dial 16. Coincident with this action, fingers 20 lift receiver 18 sufficiently to allow a connection to be made with the telephone lines, motor 46 rotates wheel 26 which in turn rotates dial 16, and speaker 44 transmits sound to receiver 18. With regard to the dialing mechanism, wheel 26 will make engagement with dial 16 at a point 48 on the periphery thereof. This will occur at all times since the mechanism will complete each cycle of rotation with flat portion 28 adjacent the dial. A stopping means can be provided on slides 22 to limit the movement of wheel 26 toward dial 16 and thereby flat portion 28 will not contact the dial. Wheel 26 rotates dial 16 preferably to the operator position and releases the dial when flat portion 28 is rotated to an adjacent position with respect to the dial. The circumference of wheel 26 is of a length sufficient to allow rotation of dial 16 to the operator position. The circumference can be adjusted by the length of flat portion 28 to the particular dial. When wheel 26 has rotated to a position where flat portion 28 is adjacent the dial, it is released and returns to its normal position. At this point in the operation, arm 30 actuates switch 34 which disconnects solenoid 36 and motor 46 from a power source. Plate 24 is then carried back to the position of non-engagement as shown in the drawing. Fingers 20 maintain receiver 18 above the cradle of the telephone and speaker 44 with its associated equipment continues to announce a message until switch 42 is depressed to disconnect power from the entire system.

With reference to FIGURE 2, there is shown the schematic diagram of the electrical system of the present invention. The drawing shows three channels for purposes of the present exemplification, however, any number of channels may be employed as desired. For purposes of this description, one channel will be explained in detail, since they each operate accordingly. Each channel contains a detecting relay 52, an actuating relay 54, and a locking relay 56. The elements of FIGURE 1 which are shown in the schematic include solenoid 36, plunger 40, switch 34 and 42, motor 46, and speaker 44 is part of an announcing system 58 as better illustrated in FIGURE 3. A source of direct current potential 60 in the form of a battery is connected at one end to relays 52 and at the other end through contacts 62 and the transducers (not shown) to the other side of relays 52. A battery charger system may be employed with battery 60, if so desired. The transducers in the present configuration are normally opened and make a closed connection when actuated by a particular event between points 64 and 66 of each channel. Contacts 65 are actuated by relay 52; contacts 67, 68, and 70 by relay 54; and contacts 62, 72, 74, and 76 by relay 56. Contacts 65 are connected in parallel with contacts 67 and contacts 68 are connected in parallel with contacts 72. A source of alternating electric power is connected to points 78 and is connected into the circuit by switch 80 and push button switch 42. Contacts 72 are connected in series with relay 56 and contacts 67 are connected in series with relay 54 to the source of electric power.

The operation of the electrical system then is as follows: Upon the occurance of a condition which is adverse to a premises or its contents, a transducer detects the condition and closes the circuit between points 64 and 66. This completes the circuit between potential 60 and the relay 52 which corresponds with the particular transducer activated. Relay 52 actuates contacts 65 to provide a connection between the source of power and relay 54 thereby actuating contacts 67, 68, and 70. Contacts 67 maintain relay 54 in the connection until it is broken by switch 34. Contacts 68 provide a connection between the source of power and relay 56 thereby actuating contacts 62, 72, 74, and 76. Contacts 70 provide a connection between the source of power and motor 46 and solenoid 36. Actuation of contacts 62 remove the connection between potential 60 and relays 52 thereby causing the transducer portion of the circuit to remain inactive under any further occurances of ill happenings. Contacts 72 provide a connection between the source of power and relay 56 and maintain that connection until the source of power is removed from the circuit by switch 42. Contacts 74 and 76 provide the necessary connections for announcing system 58 as will be more fully understood from the discussion of FIGURE 3.

Motor 46 and solenoid 36 remain in connection with the source of power until arm 30 (see FIGURE 1) activates push button switch 34 and removes the source of power from connection with relay 54. This deactivates contacts 67 which action maintains relay 54 out of connection after switch 34 returns to a closed position. An auxiliary horn system 82 is provided in series connection with relays 56 and provides additional protection to a premises. The horn system may be placed in series connection with any or all of relays 56 as desired thereby providing the protection when those corresponding channels are activated which are connected therewith. Lifting fingers 20 (FIGURE 1) may be lifted by a solenoid having a latching means connected in parallel with solenoid 36 or by a solenoid connected in parallel with the announcing system.

Figure 3:
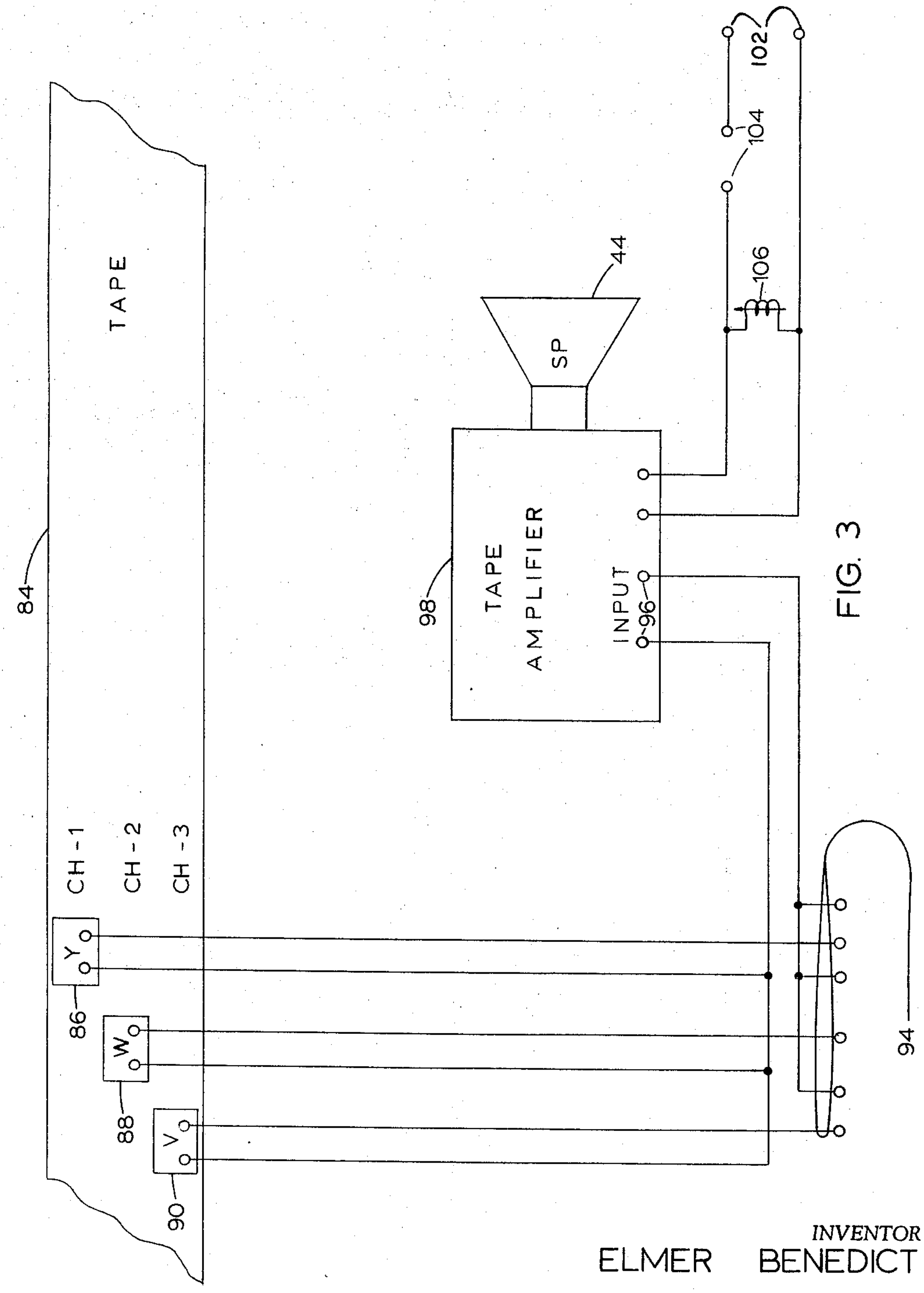
FIGURE 3 is a schematic diagram of the electrical system of the announcing system shown in FIGURE 2.

As shown in FIGURE 3, the announcing system includes a tape 84 carried by an appropriate tape transport system (not shown). The tape (more than one may be employed as desired) contains as many channels as are contained in the electrical system. For purposes of the present exemplification there are three channels shown with corresponding reading heads 86, 88, and 90. One sliding head may be employed to accommodate all channels, however. Lines 92 (shown in FIGURE 2) are connected to corresponding points 94 in the reading head circuit. Thus, each reading head is serially connected with corresponding contacts 74 to an input 96 of tape amplifier 98. With each actuation of a particular channel in the electrical system a corresponding head will read the message of the respective channel on the tape and amplifier 98 will drive speaker 44 to deliver that message to receiver 18 of the telephone. Lines 100 (FIGURE 2) are connected to points 102 and a power source is connected to points 104 thereby providing power to amplifier 98 when contacts 76 are actuated. A solenoid 106 may be connected in parallel with the amplifier to provide the lifting action to fingers 20. In this manner, no latching means is required for solenoid 106 to hold receiver 18 above its cradle.

Figure 4:
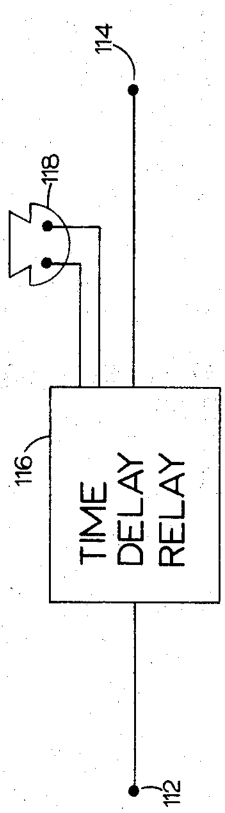
FIGURE 4 is a schematic diagram of the horn system shown in FIGURE 2.

The schematic of FIGURE 4 illustrates one configuration which may be employed for auxiliary horn system 82. Lines 108 and 110 (FIGURE 2) are connected to points 112 and 114 respectively. Serially connected therebetween is a time delay relay 116 which actuates a horn 118 after a predetermined time from the detection of an occurrence. With this configuration, should assistance not arrive within a specified time period after a channel is activated, horn 118 will sound an alarm from the exterior of the building.

Figure 5:
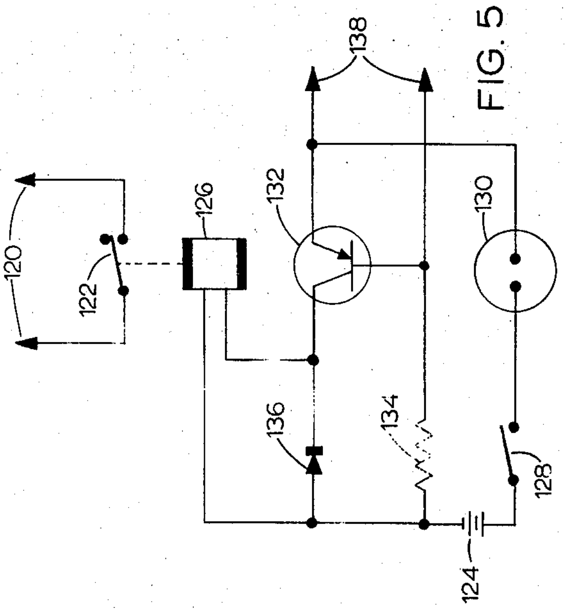
FIGURE 5 is a schematic diagram of one embodiment of a normally closed transducer circuit for use with the circut of FIGURE 2.

In alternative to the normally opened transducer employed with the electrical system of FIGURE 2, a normally closed transducer may be employed by the addition of the circuit shown in FIGURE 5. Points 120 are connected to any of the channels shown in FIGURE 2 at points 64 and 66. Contacts 122 are serially connected therewith and provide the same action as that of a normally opened transducer. A battery 124 is connected on one end to a sensing relay 126 which actuates contacts 122. A switch 128 connects the other end of the battery through a meter 130 and a transistor 132 to the other side of relay 126. The transistor includes an emitter and collector which are positioned in the circuit in relationship to the polarity of battery 124. The transistor also includes a base which is biased through a resistance 134 from one end of the battery. Connected in parallel with relay 126 is a diode 136 for allowing the flow of current in one direction to short past the relay. A normally closed transducer (not shown) may then be connected to points 138 to complete the circuit. This circuit operates in the following manner: When switch 128 is closed, a small current flows through resistance 134, the normally closed transducer, and meter 130. Since the resistance of meter 130 is relatively negligable as compared to that of resistance 134, the transistor does not conduct. However, when that circuit is opened by the functioning of the transducer to an opened state, the base of transistor 132 is biased to cause conduction and a circuit is made between battery 124 and relay 126. Actuation of the relay causes contacts 122 to close the connection which the transducer employed in FIGURE 2 would have closed.

The configuration of FIGURE 5 may be employed when it is desired to change a channel from operating on a normally opened to a normally closed basis. With this structure the system may be convertible to operate as desired.

Figure 6:
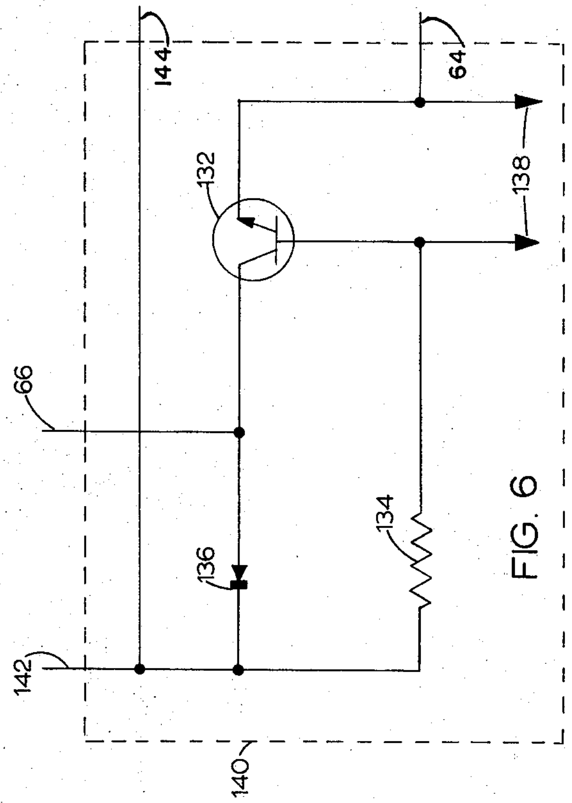
FIGURE 6 is a schematic diagram of another embodiment of a normally closed transducer circuit for use with the circuit of FIGURE 2.

Another configuration for providing a normally closed transducer circuit is shown in FIGURE 6. The dotted line box of 140 of FIGURE 2 corresponds to the position of the dotted line box 140 of FIGURE 6. The numbered lines emanating from the box of FIGURE 6 are to be connected to respectively numbered lines of FIGURE 2. Connected to points 138 is a normally closed transducer (not shown) which provides the activating action to the circuit. When the transducer provides a closed circuit a small current flows from batter 60 through resistance 134, the transducer, and contacts 62 (refer to FIGURE 2). When the transducer opens, the base of transistor 132 is biased to cause conduction through the transistor and cause a current to flow through and activate relay 52 setting the desired channel in operation to produce an alarm.

The principles of the invention explained in connection with the specific exemplifications thereon will suggest many other applications and modifications of the same. It is accordingly desired that, in construing the breadth of the appended claims, they shall not be limited to the specific details shown and described in connection with the exemplifications thereof.

What is claimed is:

1. A telephone dialing mechanism comprising a friction wheel having a flat portion on the periphery thereof, said wheel being slidably mounted for engagement on the arcuate periphery thereof with a dial of a telephone, means for rotating said wheel, and means for stopping the rotation of said wheel at a predetermined point in the rotation thereof.

2. A telephone dialing and announcing system for reporting an alarm upon the occurrence of a condition comprising a friction wheel having a flat portion on the periphery thereof, said wheel disposed for frictional engagement with a dial of a telephone; means for detecting the condition at the time of the occurrence thereof; means for rotating said wheel; means for lifting the transmitting of the telephone; means for transmitting sound to a microphone of the telephone; and means for stopping the rotation of said wheel at a predetermined point in the rotation thereof; each of said means for rotating, lifting, and transmitting being responsive to said detecting means, said wheel being slidably mounted between one position of engagement and another position of nonengagement with the dial.

3. A telephone dialing system as in claim 2 wherein said lifting means includes a finger disposed between the receiver and the telephone.

4. A system as in claim 2 including means responsive to said detecting means for transporting said wheel to the position of engagement with the dial.

5. A system as in claim 4 wherein said wheel is biased toward the position of nonengagement.

6. A system in cooperation with a telephone for reporting an alarm upon the occurrence of any one of a plurality of conditions comprising a friction wheel having a flat portion on the periphery thereof, the arcuate periphery of said wheel disposed for frictional engagement with a dial of the telephone, a motor connected to said wheel to provide rotation thereto, a plurality of detaching relays each including a set of contacts and a contacting member therebetween, a source of potential, a plurality of transducers each independently responsive to the occurrence of a particular condition and each connected between said source of potential and a respective one of said detecting relays, a plurality of actuating relays each including three sets of contacts and corresponding contacting members for each set, the set of contacts of a respective detecting relay connected across a first set of contacts of a respective one of said actuating relays, a source of electric power connected serially with each one of said actuating relays and a respective first of contacts thereof, a second and third set of contacts of each one of said actuating relays connected serially between said source of electric power and said motor, a pluraity of locking relays each including a plurality of contact sets and corresponding contacting members for each set, the third set of contacts of a respective one of said actuating relays connected across a first set of contacts of a respective one of said locking relays, each one of said locking relays connected serially with the respective first set of contacts thereof and with said source of electric power, means for lifting a receiver of the telephone a predetermined distance, and sound transmitting means disposed adjacent a microphone of the receiver, a second and third set of contacts of a respective one of said locking relays disposed for controlling said lifting means and said sound transmitting means.

7. The system of claim 6 wherein said sound transmitting means includes a multiple channel sound reproduction device including a plurality of reading heads each responsive to the third set of contacts of a respective one of said locking relays.

8. The system of claim 6 wherein a fourth set of contacts of said locking relays are connected serially with one another between each of said transducers and said source of potential.

9. The system of claim 6 including a transistor having an emitter, a collector, and a base; a diode connected in parallel with one of said detecting relays, and to the collector, a resistance connected between the base and the source of potential, the emitter and base connected serially with a respective transducer.

10. An alarm system for reporting a predetermined condition, comprising a friction wheel having a flat portion on the periphery thereof and being disposed for frictional engagement with the dial of a telephone, means for detecting the condition at the time of the occurence thereof, means for rotating said wheel, means for lifting the transmitter of the telephone, multi-channel prerecorded tapes adapted to be played when an alarm condition occurs, means for transmitting sound from the tapes to a microphone of the telephone, and means for stopping the rotation of the wheel at a predetermined point in the rotation thereof to dial a predetermined number such as the operator, each of said means for rotating, lifting, and transmitting being responsive to said detecting means, said wheel being slidably mounted between one position of engagement and another position of non-engagement with the dial, said wheel being normally positioned in nonengagement with said dial, and being returned to said non-engaged position a predetermined time after engagement to allow said telephone to normally be independent operable condition.

References Cited

UNITED STATES PATENTS

| | | | |
|---|---|---|---|
| 2,202,366 | 5/1940 | Aaron et al. | 179—90.1 |
| 3,095,478 | 6/1963 | Adams | 179—5 |
| 3,131,260 | 4/1964 | Evans | 179—5 |
| 3,170,990 | 2/1965 | Beatty | 179—90.1 |

ROBERT L. GRIFFIN, *Primary Examiner.*

J. T. STRATMAN, *Assistant Examiner.*